United States Patent [19]

Nigam et al.

[11] Patent Number: 4,717,981
[45] Date of Patent: * Jan. 5, 1988

[54] HARD DISC CARTRIDGE ARRANGEMENT WITH AN AUTOMATICALLY ACTIVATED DOOR

[75] Inventors: Anil Nigam, Cupertino; Dominic Mercurio, San Jose, both of Calif.

[73] Assignee: SyQuest Technology, Fremont, Calif.

[*] Notice: The portion of the term of this patent subsequent to Mar. 5, 2002 has been disclaimed.

[21] Appl. No.: 40,741

[22] Filed: Apr. 9, 1987

Related U.S. Application Data

[63] Continuation of Ser. No. 520,319, Aug. 4, 1983, abandoned.

[51] Int. Cl.4 .................. G11B 23/02; G11B 5/82
[52] U.S. Cl. .................... 360/133; 360/99; 206/444
[58] Field of Search ............. 360/97, 99, 133, 135; 206/307, 444, 312

[56] References Cited

U.S. PATENT DOCUMENTS

| | | | |
|---|---|---|---|
| 4,131,199 | 12/1978 | Hatchett et al. | 360/133 |
| 4,239,238 | 12/1980 | Coleman | 360/99 |
| 4,320,430 | 3/1982 | Vogt | 360/133 |
| 4,358,801 | 11/1982 | Faber et al. | 360/97 |
| 4,400,748 | 8/1983 | Bauck et al. | 360/99 |
| 4,488,190 | 12/1984 | Oishi et al. | 360/97 |
| 4,503,474 | 3/1985 | Nigam | 360/133 |
| 4,511,944 | 4/1985 | Saito | 360/97 |
| 4,546,397 | 10/1985 | Asani et al. | 360/133 |
| 4,559,575 | 12/1985 | Noto et al. | 360/133 |
| 4,581,670 | 4/1986 | Nemoto et al. | 360/99 |
| 4,583,144 | 4/1986 | Kato | 360/99 |

FOREIGN PATENT DOCUMENTS

| | | | |
|---|---|---|---|
| 55-42311(A) | 3/1980 | Japan | 360/133 |
| 58-57685(A) | 4/1983 | Japan | 360/133 |
| 58-97166(A) | 6/1983 | Japan | 360/133 |
| 59-16178(A) | 1/1984 | Japan | 360/86 |
| 59-3741(A) | 1/1984 | Japan | 360/97 |
| 2110462(A) | 6/1983 | United Kingdom | 360/99 |

OTHER PUBLICATIONS

IBM Technical Disclosure Bulletin, vol. 27, No. 1A, Jun. 1984, pp. 40–41, "Shutter Mechanism for Flexible Disk Cartridge", by Carey et al.

Primary Examiner—John H. Wolff
Assistant Examiner—Alfonso Garcia
Attorney, Agent, or Firm—Fliesler, Dubb, Meyer & Lovejoy

[57] ABSTRACT

A hard disc cartridge arrangement 10 including a housing 12 and a hub clamp 22 which cooperate so that the hub clamp 22 firmly and precisely engages the spindle of a disc drive, and a door arrangement 24 which allows the heads of the disc drive to enter the cartridge 10 from the upper and lower surfaces 14, 16 of the cartridge 10. The door 26 is locked in the closed position to prevent contact with the data storage media and is urged to a positive open position so that it does not interfere with the placement of the heads adjacent the disc 20.

3 Claims, 5 Drawing Figures

HARD DISC CARTRIDGE ARRANGEMENT WITH AN AUTOMATICALLY ACTIVATED DOOR

This application is a continuation of application Ser. No. 520,319, filed on Aug. 4, 1983 abandoned.

DESCRIPTION

TECHNICAL FIELD

The present invention relates to a disc cartridge arrangement for a disc drive for information storage and retrieval.

BACKGROUND ART

A cartridge arrangement for a disc drive generally comprises a disc which is either flexible or rigid (hard) and which is coated with a material upon which information can be stored magnetically or optically. A housing is provided about the disc to protect the disc from environmental contamination. The disc is mounted on a hub which is in turn mounted through the housing such that the hub can engage with the spindle of a disc drive unit. The housing includes an aperture for allowing reading and recording heads to have access through the housing to the disc. The housing further includes a door arrangement which closes over the aperture when the cartridge arrangement is not in use to prevent contamination from entering the housing.

In designing a cartridge arrangement, there are several considerations which the prior art does not adequately take into account. First, the cartridge must be designed in such a way that the possibility of contaminations entering the housing is minimized. Second, the cartridge must be designed in such a way that the door arrangement, which closes over the aperture when the cartridge arrangement is not in use, can be accurately positioned in an open position so that the door does not interfere with the orderly placement of the read/write heads into contact with the disc. Third, the cartridge arrangement must be designed so that the user cannot accidentally or intentionally open the door, potentially contacting the disc and destroying data stored thereon.

The present invention takes into consideration these shortcomings of prior cartridge arrangements.

SUMMARY OF THE INVENTION

The present invention is directed to a cartridge with a hard data storage disc, which cartridge is removably insertable into a disc drive and comprises a housing, a hub means for mounting the hard disc to the housing so that the disc is free to rotate with respect to the housing, and wherein said housing defines an aperture for allowing access through the housing to the disc. The cartridge further includes a door means for selectively covering and uncovering the aperture with a first position for covering said aperture and a second position for uncovering the aperture. The cartridge further includes means for selectively locking the door in the first position and means for selectively unlocking the door from the first position and urging the door into a second position.

In another aspect of the invention, the means for selectively locking the door includes a recess defined by one of the door means and the housing and a projection defined by the other of the door means and the housing, the projection being received in the recess for locking the door in the first position.

In yet another aspect of the invention, the door is biased toward the first position.

In still a further aspect of the invention, a cam means is included for urging the projection out of the recess.

In still another aspect of the invention, the means for unlocking the door includes a first cam for urging the projection out of the recess and urging the door towards the second position, and a second cam for further urging the door means into the second position.

In another aspect of the invention the door includes a cover with an arm projecting therefrom, the means for selectively locking the door includes a recess defined by one of the arm and the housing, and a projection defined by the other of the arm and the housing, the projection being received in the recess for locking the door in the first position. Further, the means for selectively unlocking the door has a lever and cam arrangement. The lever and cam arrangement is pivotally mounted in the housing, and includes means for engaging the arm. The lever and cam arrangement has a first cam means for urging the projection out of said recess and urging said door means towards said second position and a second cam means for further urging said door means into said second position.

From the above it can be seen that the present invention solves the needs which were brought into focus by the prior art. In other words, the present invention provides a door which, when closed, stays closed to prevent contamination from entering the housing and potentially destroying data. Further, the cover, when the cartridge is inserted into a disc drive, is opened exactly and precisely so that the door does not interfere with the proper movement and placement of the heads relative to the disc.

DESCRIPTION OF THE PREFERRED EMBODIMENT

The present invention is related to the invention as described in U.S. Pat. No. 4,503,474, which was filed on June 4, 1982, and is assigned to SyQuest Technology, the present assignee, and which is incorporated by reference herein.

Figure 1:
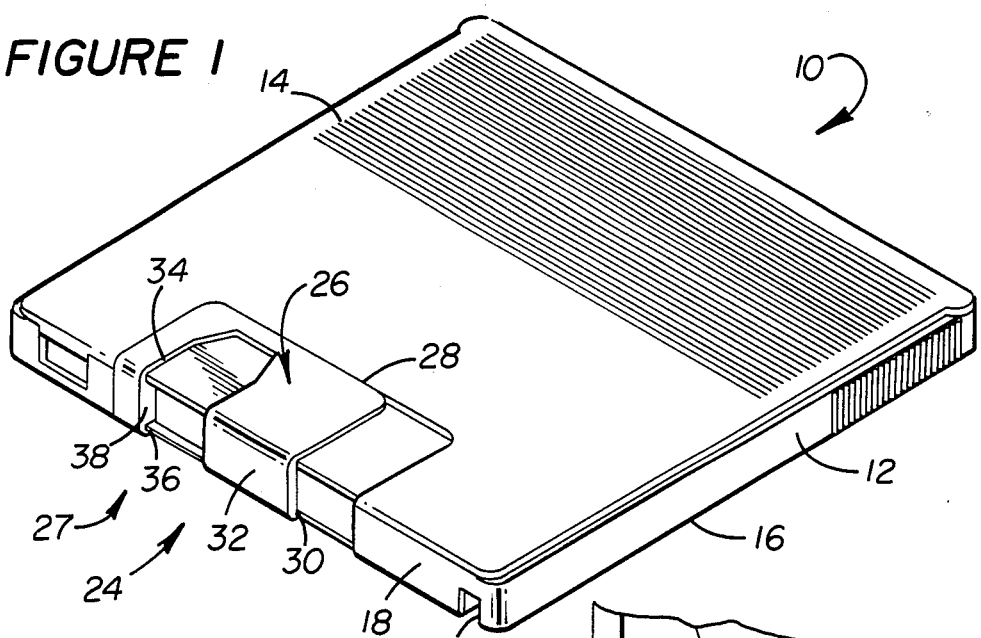
FIG. 1 is a perspective view of an embodiment of the invention.
Figure 4A:
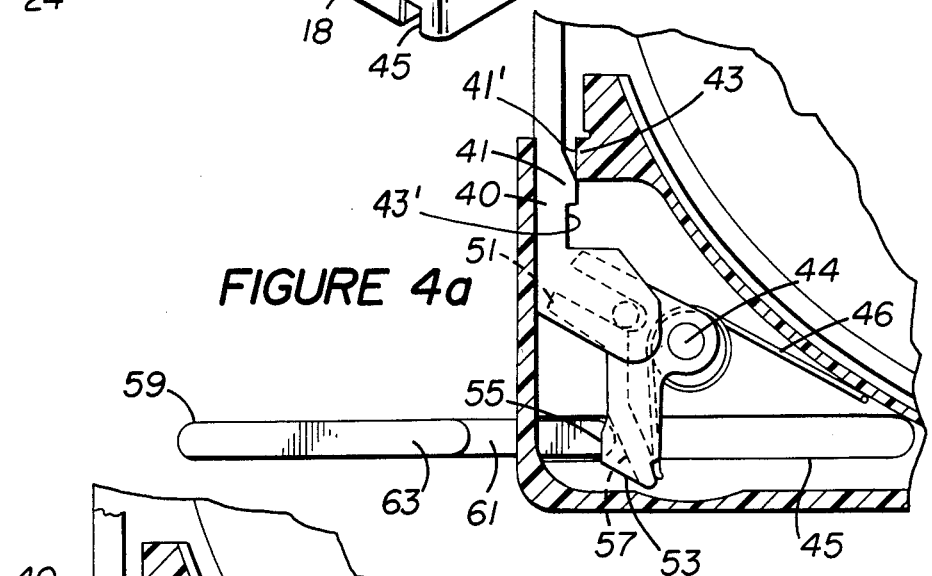
FIGS. 4a, 4b are partial cross-sectional views of the lever and cam arrangement of the embodiment of FIG. 1.
Figure 4B:
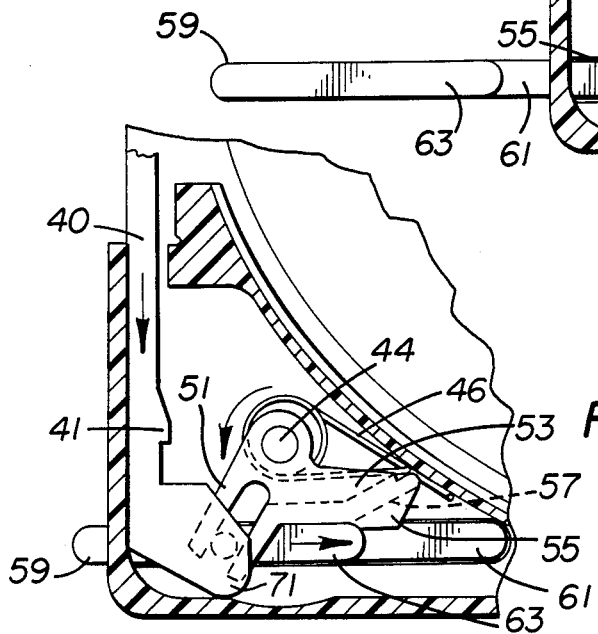

With reference to the figures and in particular to FIG. 1, a disc cartridge arrangement, with a hard data storage disc, which arrangement is removably insertable into a disc drive, is depicted and designated by the numeral 10. Cartridge 10 includes a housing 12 which is comprised of two substantially planar and parallel upper and lower sides 14 and 16 and a peripheral side 18 which is substantially perpendicular to the upper and lower sides 14 and 16 in a preferred embodiment. Located inside the housing 12 in a preferred embodiment is a hard disc 20 for magnetically storing information. It is to be understood that the disc could incorporate optical or other methods of data storage. The disc 20 is secured to a hub 22 which hub is disposed through housing 12 as will be discussed hereinbelow.

The disc cartridge arrangement 10 further includes a door means 24 which allows the reading and recording heads to access the disc 20. Door means 24 includes a door 26 which is substantially U-shaped in cross-section and is slidingly mounted to both the upper and lower sides 14 and 16 and is slidable over the portion of the peripheral side 18 which joins the above portions of the upper and lower slides 14 and 16. Door 26 defines a first side portion 28 which slides over the upper side 14, a second side portion 30 which slides over the lower side 16, and a peripheral portion 32 which joins the first and second portion 28 and 30 and slides relative to peripheral side 18. The door 26 defines an aperture 27 as follows. First and second side portions 28 and 30 define apertures 34 and 36, respectively, which are trapezoidal in shape in a preferred embodiment and which are lined up one above the other. Apertures 34 and 36 communicate with an aperture 38 defined by the peripheral portion 32 of door 26.

Door 26 further includes a linkage or arm 40 which is secured to the peripheral portion 32 and which extends from the side of the peripheral portion 32 and engages a lever and cam arrangement 42 which is pivotally mounted to the housing by pin 44.

Lever and cam arrangement 42 includes lever 51 and lever 53, a first cam 55 and a second cam 57. The linkage or arm 40 consists of a pin 44 which is received in a slot in the lever 51 so that the lever 51 is capable of opening and closing the door. When cam and lever arrangement 42 is urged to pivot about pin 44, the linkage 40 is moved to the side, sliding the door 26 towards the cam and lever arrangement 42. A torsion spring 46 is positioned in the housing 12 about pin 44 to cause the lever and cam arrangement 42 to urge the door 26 closed. The torsion spring 46 slips over pin 44 with one leg loaded against lever 53 and the other leg resting on a wall provided in housing 12.

The first cam 55 and the second cam 57 both project from lever 53 of the arrangement 42 in the same direction. Cam 55 is located above cam 57 and projects further from lever 53 than does cam 57.

The housing 12 defines an aperture 47 which includes a first substantially trapezoidal shaped aperture 48 in the first planar side 14 and a second substantially trapezoidal aperture 50 in the second planar side 16, and an aperture 52 in the peripheral side 18 of the housing which communicates and joins the apertures 48 and 50. The apertures 34, 36 and 38 of the door 26 can be slid into alignment with the apertures 48, 50 and 52 of the housing through the lever and cam arrangement 42 to give the reading and recording heads (not shown) access to the disc 20 through not only the peripheral side 18, but also through the upper side 14 and the lower side 16.

Figure 2:
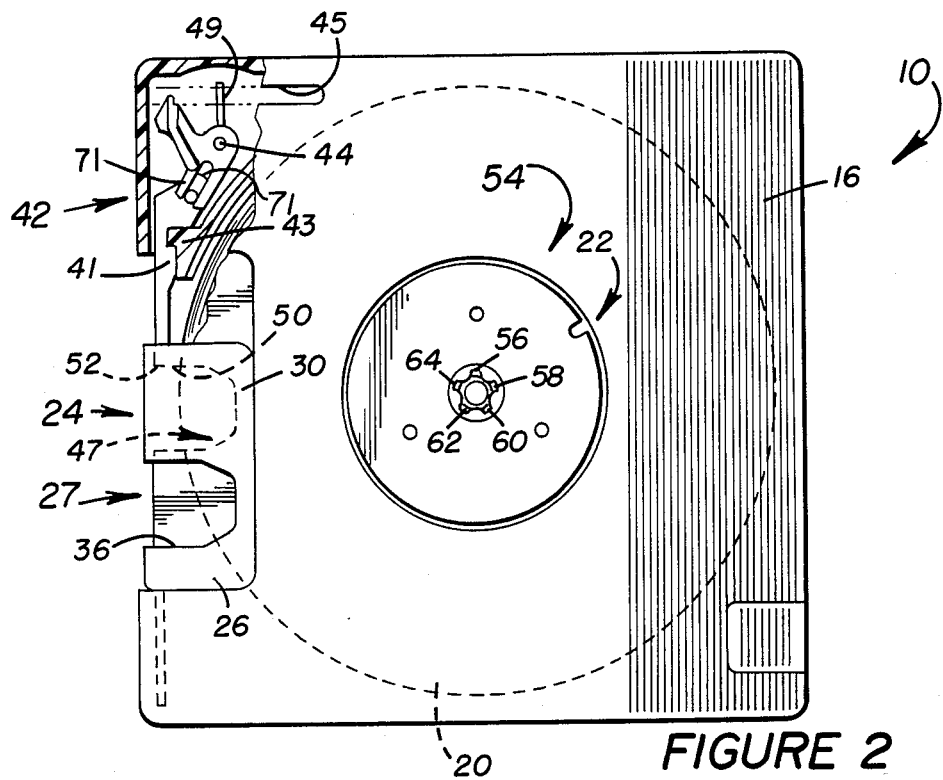
FIG. 2 is a bottom view of the embodiment of FIG. 1.

The linkage or arm 40 includes a projection 41 which can be received in a recess 43 defined on an inside surface of the housing 12. When the projection 41 is received in the recess 43, door 26 is locked in a first position so that the door 26 covers the aperture 47 of the housing 12 (FIG. 2). Along with the urging of the door 26 to a second position wherein the aperture 27 is not aligned with the aperture 47, allowing access to the disc, the lever and cam arrangement 42 causes the projection 41 to be urged out of the recess 43. It is to be understood that, alternatively, the projection 41, can be placed on the internal surface of the housing 12 at 41' and recess 43 can be constructed in the linkage 40 at 43'. Further, a surface 49 is provided for engaging with the linkage 40 at end 51 as the door 26 is urged to the open position in order to keep the door 26 from bowing and thus keeping the door 26 properly aligned.

A slot 45 is defined through the lower side 16 of the housing 12. Slot 45 is located directly below cam and lever arrangement 42. Slot 45 is additionally defined by a portion of the peripheral side immediately adjacent to the door 26. Through slot 45, a two step member 59 which can be part of a disc drive, can be introduced to actuate the cam and lever arrangement 42 to open the door 26. The height of this upstanding member 59 from side 16, is lower than the lever 51, thereby allowing lever 51 to pass thereover, so as not to provide interference with lever 51 or with linkage 40 in the fully open condition.

Two-step member 59 includes a lower first step 61 and a higher second step 63. The lower first step 61 first engages cam 57 and urges projection 41 out of recess 43 and continues to urge the door 26 toward the second position. The second step 63 then engages the second cam 55 to finally position the door 26 in an open position so that the aperture in the door is aligned with the aperture in the housing 12. Accordingly the door does not interfere with the read/write heads (not shown) of a disc drive.

The hub 22 includes a hub clamp 54 as shown in FIG. 2 which is located relative to the lower side 16 of the housing 12. Hub clamp 54 is designed for engaging a spindle (not shown) of a disc drive and accurately positioning the disc relative to the spindle. In a preferred embodiment the hub clamp includes fingers 56, 58, 60, 62, 64 which extend from equidistant positions about the hub and project inwardly. The fingers act as springs to securely engage the spindle and accurately position the hub 22 on the spindle. The fingers 56, 58, 60, 62 and 64 are designed such that they are always flexed below the flexural fatigue endurance limit of the material when they are pushed apart to accept the spindle. The fingers can be constructed of a variety of metals and plastics, as is well known in the industry. As the fingers are equally spaced about the spindle and each applies the same pressure, the hub clamp 54 arrangement is self-centering.

Figure 3:
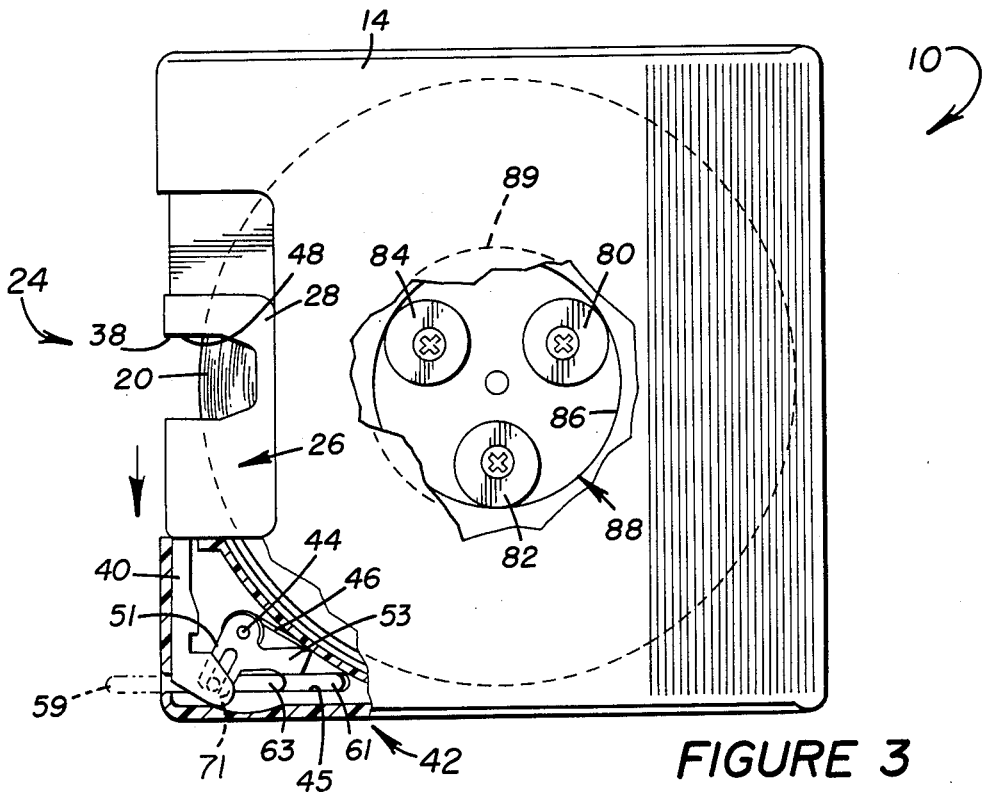
FIG. 3 is a top view of the embodiment of FIG. 1 with a portion thereof broken away.

The hub 22 includes, in a preferred embodiment, three eccentric cams 80, 82 and 84 on the surface opposite that which has the hub clamp 54 (FIG. 3). These cams are held in position by appropriate screws which are provided through bevelled apertures in the eccentric cams 80, 82 and 84. As the screws are inserted into the bevelled apertures, the cams 80, 82, 84 are urged outwardly into engagement with the periphery 86 of the central aperture 88 of the disc 20. This insures a positive engagement between the disc 20 and the hub 22 so that the disc 20 is accurately fixed with respect to the hub 22. This arrangement prevents the disc from having any radial movement with respect to the center established by the fingers 56, 58, 60, 62, 64. A clamp disc 89 sits on top of the cams 80, 82, 84 and the disc 20 and is secured to the hub clamp 54 by three screws (not shown) that are torqued suitably to contain any vertical motion of the disc 20 in the cartridge assembly.

Further it is to be understood that in a preferred embodiment housing 12 is comprised of a durable plastic material so that at least side 16 about hub 22 is flexible. This flexibility assists in the proper seating of the fingers 56, 58, 60, 62, 64 about the spindle.

Industrial Applicability

The operation of the disc cartridge arrangement 10 is as follows. The cartridge 10 is inserted in a disc drive (not shown) and as the hub clamp 54 comes into alignment with the spindle, member 59 of the disc drive extends into the slot 45 to open door 26. With door 26 open the apertures 34, 36 and 38 are aligned with apertures 48, 50 and 52 so that the heads (not shown) of the disc drive (not shown) can be deployed through the upper and lower sides 14 and 16 of the housing 12 into a position immediately adjacent to the upper and lower sides of the disc 20. The hub clamp 54 is at the same time urged down onto the spindle with the fingers 56, 58, 60, 62 and 64 thereof firmly engaging the spindle circumferentially. The region of the housing immediately around the hub 22 flexes as the cartridge 10 is urged down on the spindle and then urged slightly away from the spindle by the disc drive so that the fingers are properly seated about the spindle.

It is to be noted that the lever and cam arrangement 42 is designed in such a way that the member 59 of the disc drive (not shown) when inserted into the slot 45 essentially pushes the lever and cam arrangement 42 out of the way as it proceeds therepast, so as to first unlock door 26 and then urge it precisely to the open position.

From the above, it can be seen that the cartridge arrangement 10 allows for contaminant-free operation and that the door means 24 and the hub clamp 54 allow for proper alignment.

Other aspects, objects, advantages of the invention can be obtained from a study of the drawings, the disclosure and the appended claims.

I claim:

1. A cartridge with a data storage medium comprising:
   a housing;
   said housing defining a aperture for allowing access through said housing to said disc;
   door means for selectively covering and uncovering said aperture with a first position for covering said aperture and a second position for uncovering said aperture, said door means includes a cover and an arm projecting therefrom;
   means for selectively locking said door in said first position, said means for selectively locking said door includes a recess defined by said housing, and a projection defined by said arm, said projection being received in said recess for locking said door in the first position;
   means for selectively unlocking said door means from said first position and urging said door means into said second position, said means for selectively unlocking said door means being pivotally mounted in said housing, and including lever means for engaging said arm, and a first cam means for urging said projection up and out of said recess and urging said door means toward said second position and a second cam means for further urging said door means into said second position whereby a two step member is adapted to engage and displace said first cam means and said second cam means in order to urge said door means from the first to the second position.

2. A cartridge with a data storage medium comprising:
   a housing;
   said housing defining a aperture for allowing access through said housing to said disc;
   door means for selectively covering and uncovering said aperture with a first position for covering said aperture and a second position for uncovering said aperture, said door means includes a cover and an arm projecting therefrom;
   means for selectively locking said door in said first position, said means for selectively locking said door includes a recess defining by said arm, and a projection defined by said housing, said projection being received in said recess for locking said door in the first position;
   means for selectively unlocking said door means from said first position and urging said door means into said second position, said means for selectively unlocking said door means being pivotally mounted in said housing, and including lever means for engaging said arm, and a first cam means for urging said projection up and out of said recess and urging said door means toward said second position and a second cam means for further urging said door means into said second position whereby a two step member is adapted to engage and displace said first cam means and said second cam means in order to urge said door means from the first to the second position.

3. The cartridge of claim 1 including:
   means for biasing said door toward the first position.

* * * * *